United States Patent [19]
Döbbeling et al.

[11] Patent Number: 6,164,058
[45] Date of Patent: Dec. 26, 2000

[54] ARRANGEMENT FOR DAMPING COMBUSTION-CHAMBER OSCILLATIONS

[75] Inventors: Klaus Döbbeling, Windisch; Christian Paschereit, Baden; Wolfgang Polifke, Windisch, all of Switzerland

[73] Assignee: ABB Research Ltd., Zurich, Switzerland

[21] Appl. No.: 09/111,779

[22] Filed: Jul. 8, 1998

[30] Foreign Application Priority Data

Jul. 15, 1997 [EP] European Pat. Off. ............. 97810490

[51] Int. Cl.⁷ .................................. F23R 3/04; F23R 3/50
[52] U.S. Cl. ........................... 60/39.36; 60/725; 431/114
[58] Field of Search ............................. 60/39.36, 39.77, 60/725, 760; 431/114

[56] References Cited

U.S. PATENT DOCUMENTS

| | | | |
|---|---|---|---|
| 2,256,198 | 9/1941 | Hahn | 60/39.36 |
| 2,930,195 | 3/1960 | Blackman et al. | 60/725 |
| 3,734,234 | 5/1973 | Wirt . | |
| 3,848,697 | 11/1974 | Jannot et al. . | |
| 4,137,992 | 2/1979 | Herman . | |
| 4,199,936 | 4/1980 | Cowan et al. . | |
| 4,298,090 | 11/1981 | Chapman . | |
| 5,044,930 | 9/1991 | Hongo et al. . | |
| 5,644,918 | 7/1997 | Gulati et al. | 60/725 |

FOREIGN PATENT DOCUMENTS

0597138A1  5/1994  European Pat. Off. .

*Primary Examiner*—Louis J. Casaregola
*Attorney, Agent, or Firm*—Burns, Doane, Swecker & Mathis, L.L.P.

[57] ABSTRACT

In an annular combustion chamber for a gas turbine, a combustion-chamber dome (14) is arranged upstream of an air-cooled combustion chamber (10). A first portion of an air flow (46) which comes from the compressor is admixed as combustion air to the combustion operation and cooling ducts (22; 24) feed a second portion of the air flow (46) coming from the compressor as cooling air into the combustion chamber (10). In this case, the cooling ducts (22; 24), which run at least in sections along the combustion chamber (10), have an entry (23; 25) into the combustion-chamber dome (14). The cooling ducts (22; 24) are designed for damping combustion-chamber oscillations in such a way that the acoustic impedance at the entry (23; 25) of the cooling ducts (22; 24) into the combustion-chamber dome (14) is minimized.

10 Claims, 3 Drawing Sheets

ARRANGEMENT FOR DAMPING COMBUSTION-CHAMBER OSCILLATIONS

BACKGROUND OF THE INVENTION

1. Field of the Invention

The invention relates to an annular combustion chamber for a gas turbine in which a combustion-chamber dome is arranged upstream of an air-cooled combustion chamber, at least a portion of an air flow which comes from the compressor being directed via cooling ducts which run at least in sections along the combustion chamber, the cooling ducts having an entry into the combustion-chamber dome.

2. Discussion of Background

In conventional combustion chambers, a first portion of an air flow coming from the compressor is fed as combustion air to the burners seated in the dome. A second (in general the larger) portion of the air flow coming from the compressor is directed through cooling ducts, which run at least in sections along the inner and/or outer combustion chamber, and convectively cools the combustion-chamber walls in order to then likewise be collected in the combustion-chamber dome and fed to the combustion operation. A small portion of the cooling air directed through the cooling ducts is possibly fed into the combustion chamber in order to cool the combustion-chamber walls.

In combustion chambers as used in particular in gas turbines, undesirable thermoacoustic oscillations often occur. These thermoacoustic oscillations involve a mutually amplifying interaction of thermal and acoustic disturbances. In the process, undesirably high oscillation amplitudes may occur and these may lead to high mechanical loading of the combustion chamber, an increase in the emissions due to inhomongeneous combustion, and in the extreme case to extinction of the flame. In conventional combustion chambers, the cooling by means of blowing cooling air into the combustion chamber along the combustion-chamber walls generally plays an important role in the sound damping and thus in the damping of such oscillations of the combustion chamber. In order to achieve low $NO_x$ emissions, an increasing proportion of the air is directed through the burner itself in modern gas turbines; the blowing-in of the cooling air is therefore reduced. In order to reduce the thermal loading of the combustion-chamber walls to a tolerable level, the combustion-chamber walls are cooled convectively. The air required for this is collected in the combustion-chamber dome and thus fed to the burners. Due to the lower degree of sound damping accompanied by this, the problems referred to at the beginning and associated with the undesirable oscillations consequently occur to an increased extent in such modern combustion chambers.

Experience has now shown that thermoacoustic oscillations or instability occur in particular close to the natural oscillations of the oscillating system. In this case, the oscillating system consists of the combustion chamber and also, depending on the acoustic boundary conditions, adjoining volumes, for instance the combustion-chamber dome. The frequencies of the pressure and velocity fluctuations then lie close to the natural frequencies of the system, and also the oscillation modes, that is, the spatial structure of the oscillation amplitudes correspond approximately to one of the natural modes of the system.

In modern gas turbines, annular combustion chambers of small radial extent are often used. When discussing oscillations and oscillation modes in such annular combustion chambers, it is advisable to use cylindrical coordinates $\rho$, $\phi$, $z$. The latter are related to the right-angled Cartesian coordinates x, y, z in a conventional manner via x=$\rho$ cos y, $\rho$=sin $\phi$, z=z. The radial coordinate $\rho$ is essentially constant in the case of an annular combustion chamber of small axial extent and is equal to the radius of the combustion chamber R. The coordinate z runs along the axis of the combustion chamber. The angle $\phi$ runs around the axis of the combustion chamber. It is designated below as azimuth. Oscillation modes in which the pressure fluctuations exhibit no variation in the z-direction but only a variation with the azimuth angle $\phi$ are called purely azimuthal oscillation modes.

In the said annular combustion chambers of small axial extent, experience shows that the purely azimuthal modes, in particular the azimuthal fundamental mode, are especially important. Since the combustion-chamber radius in such combustion chambers is typically as large as the length of the combustion chamber and thus the circumference of the combustion chamber is substantially larger than the length, these azimuthal modes also have the lowest oscillation frequencies. In this case, the oscillation frequency of the purely azimuthal modes is an integral multiple of the azimuthal fundamental mode. Experience shows that the damping of the lowest thermoacoustic oscillations is especially important.

Purely azimuthal oscillations are only possible if both ends of the oscillating system have a high acoustic impedance. This condition is certainly fulfilled at one end—the combustion-chamber discharge to the turbine. Since the pressure drop at the burners is relatively small, the combustion-chamber dome must be included in the consideration at the other end.

There, the combustion-chamber dome then forms the acoustically hard end (high impedance) of the oscillating system. The acoustic impedance of the combustion-chamber dome can now be reduced by enlarging the bypass openings. However, this is not a practical way in many cases, since, for example, the cooling-air mass flows are further reduced as a result.

It is also possible to use Helmholz resonators, as described, for instance, in EP-A1 0 597 138, in the region of the dome. However, this is not always possible, for reasons of space. Helmholz resonators also act only within a narrow frequency band around a fundamental frequency. If a plurality of modes having various frequencies are to be damped, a series of Helmholz resonators would be necessary, which requires a large amount of space and considerable design input.

SUMMARY OF THE INVENTION

Accordingly, one object of the invention is to provide a novel arrangement for damping thermoacoustic oscillations in combustion chambers, in particular for damping azimuthal thermoacoustic oscillation modes in annular combustion chambers, in which arrangement the cooling-air mass flows are not reduced further and which, in addition to a fundamental frequency, can also dampen the harmonics of the latter and requires as small a design input as possible and as small a space as possible.

This object is achieved according to the invention by resonant tuning of the cooling ducts. To this end, the acoustic properties of the cooling ducts are tuned in such a way that the acoustic impedance at the entry location of the cooling air into the combustion-chamber dome becomes minimal at the frequency of the azimuthal fundamental mode of the combustion chamber (or of the system of combustion chamber/combustion-chamber dome).

According to the invention, this is achieved by the length of the cooling ducts being selected in such a way that they become resonant at the frequencies to be damped. Since the cooling-air ducts are acoustically open on both sides, resonance occurs when the length of the cooling-air ducts is exactly half the wavelength of the (azimuthal) fundamental frequency to be damped.

In addition, it is advantageous to subdivide the cooling-air feed by meridian partitions into ducts which are separate from one another, so that no azimuthal oscillations can occur in the cooling-air feed.

In order to achieve the requisite length of the cooling-air ducts in typical annular combustion chambers, those ends of the cooling-air ducts which lead out in the collecting space are lengthened, so that the cooling-air ducts run according to the invention along the combustion chamber and bend back at its end into the collecting space.

It is especially advantageous if the cooling-air ducts are run spirally around the combustion chamber. In this case, the requisite length of the cooling ducts can be achieved by suitable selection of the angle between the combustion-chamber axis and the orientation of the ducts, the cooling-air ducts at the same time always being run on the combustion-chamber wall.

Furthermore, it is of advantage if, at the location of the entry of the cooling ducts into the collecting space, the cross-sectional area of the collecting space at this point ($A_{collecting\ space}$) is markedly greater than the opening of the cooling duct at this point ($A_{cooling\ duct}$) This results in clearly defined boundary conditions at the openings of the cooling ducts into the collecting space, and these boundary conditions lead as far as possible to complete reflection of the oscillations in the cooling duct.

It is of advantage that cooling ducts of such design are tuned not only to the fundamental frequency but also to harmonic oscillations of the undesirable thermoacoustic oscillations. In this case, it can be of advantage to produce cooling ducts of different length, so that they dampen various frequencies on account of their different length.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only the elements essential for the understanding of the invention are shown. Not shown are, for example, the exhaust-gas casing of the gas turbine with exhaust-gas tube and flue, the compressor part, the turbine and the details of the burner, such as, for example, the fuel nozzle. The direction of flow of the working media is designated by arrows.

DESCRIPTION OF THE PREFERRED EMBODIMENTS

Figure 1:
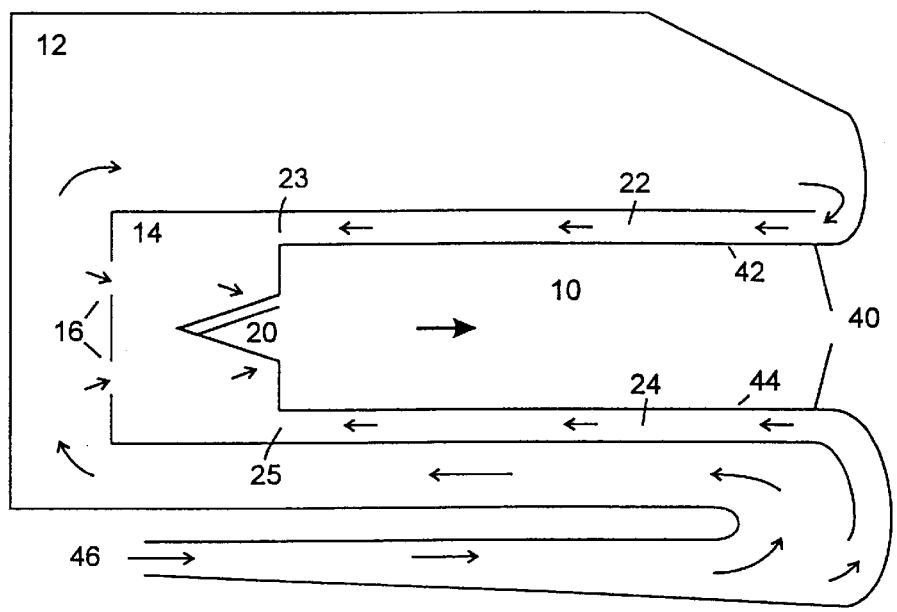
FIG. 1 shows a partial longitudinal section of an annular combustion chamber according to the prior art in schematic representation.

Referring now to the drawings, wherein like reference numerals designate identical or corresponding parts throughout the several views, FIG. 1 shows a conventional annular combustion chamber which is constructed so as to be rotationally symmetrical about the machine axis 30. As indicated by the arrows, compressed air flows from the compressor into the collecting space 12. The main portion of the air passes through the cooling ducts 22 and 24 into the combustion-chamber dome 14 and from there through the burner 20 into the combustion chamber 10. The rest of the air passes directly through the bypass openings 16 into the combustion-chamber dome 14. The burner 20 is only shown schematically in FIG. 1. It further contains, inter alia, a fuel nozzle (not shown), through which fuel is injected into the combustion chamber. A small portion of the air flows as film- or effusion-cooling air from the cooling ducts 22 and 24 through a plurality of openings in the wall parts 42 and 44 into the combustion chamber 10. The reference numeral 40 marks the discharge to the turbine (not shown).

Experience shows that thermoacoustic oscillations occur in such an annular combustion chamber, in particular close to the natural oscillations of the oscillating system. In annular combustion chambers of small height and axial extension, as in FIG. 1, experience shows that the purely azimuthal modes, in particular the azimuthal fundamental mode, are especially important. In this case, the oscillating system consists of the volume formed from the combustion chamber 10 and the combustion-chamber dome 14, since the pressure loss at the burners 20 is too small for an acoustically hard termination to be formed there.

The natural modes of this system can be classified like the natural modes of an annular gap by an axial index m and an azimuthal index n, that is, a pair (m, n). The pressure fluctuations of the natural oscillations of the system are then of the form:

$$\Delta p(z, \phi) \ \cos(\pi m z/L)\sin(n\phi) \tag{1}$$

with associated natural frequencies:

$$(\omega_{m,n}/c)^2 = (\pi m/L)^2 + (n/R)^2 \tag{2}$$

Here, L represents the length of the oscillating system, that is, the length of the combustion chamber 10 and the combustion-chamber dome 14. R represents the radius of the annular gap, that is, approximately in FIG. 1 the length of the perpendicular to the axis of symmetry 30 from this axis of symmetry to the burner 20, z represents the coordinate parallel to the axis of symmetry 30, and $\phi$ represents the azimuthal angle about this axis.

Experience now shows that, in annular combustion chambers of gas turbines, in particular the purely azimuthal modes (0.n) and in particular the azimuthal fundamental mode (0.1) occur during thermoacoustic instabilities. Typically, at least some of the higher modes (0.n) occur together with the fundamental oscillation (0.1). It follows from equation (2) that the frequencies of these higher modes are integral multiples of the frequency of the fundamental oscillation, $\omega_{0,n} = n\ \omega_{0,1}$. The value of n up to which higher modes occur during the oscillations of the combustion chamber to a significant amplitude is designated below by $n_{max}$. The frequency of the azimuthal fundamental mode $\omega_{0,1}$ is designated below in brief by $\omega_0$.

According to the invention, the acoustic properties of the cooling ducts are now tuned in such a way that the acoustic impedance at the entry location 23 or 25 of the cooling air into the combustion-chamber dome becomes a minimum at the frequencies to be damped. This is the case if the cooling ducts become resonant at these frequencies.

It is advantageous with regard to the sound damping to divide the cooling-air feed by means of meridian partitions 47 into segments which are separate from one another, so that no azimuthal oscillations can occur in the cooling-air feed. The number of these segments should be selected in such a way that only purely axial oscillations can occur in each cooling-duct segment.

Figure 3A:
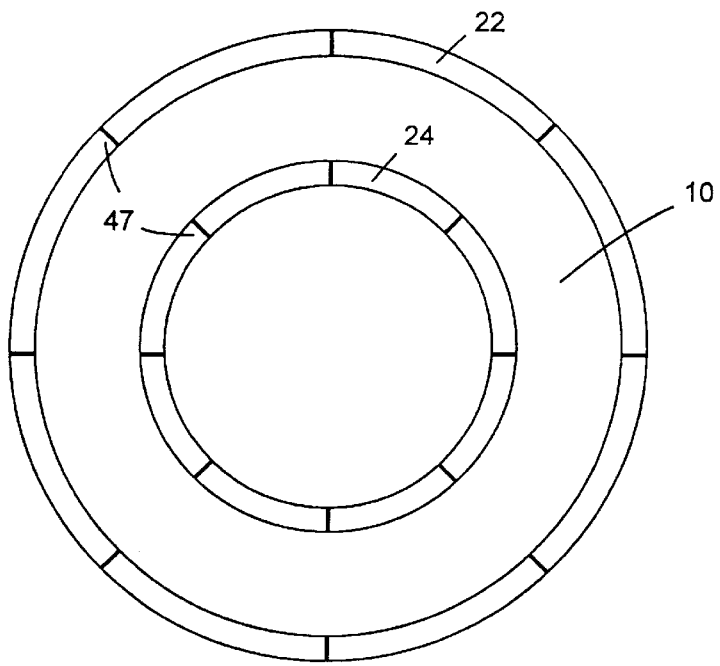
FIG. 3a shows an axially normal section through the inner and outer wall of a combustion chamber.

FIG. 3a shows inner cooling ducts 24 and outer cooling ducts 22 in an axially normal section through the inner and outer wall of a combustion chamber. The combustion chamber shown in FIG. 3a provides by way of example a subdivision into 8 segments, which are separated from one another by partitions 47. For reasons of cooling optimization and mechanical integrity, it is of advantage to subdivide the cooling ducts into a large number (order of magnitude of up to 100 or more) of segments. With such a number, the width of the segments is certainly small enough to suppress the azimuthal oscillation portion.

Since the cooling ducts are acoustically open on both sides, resonance occurs if the length $L_c$ of the cooling ducts is exactly an integral multiple of half the wavelength of the axial oscillations in the cooling ducts, that is:

$$L_c = N \lambda/2 \quad (3)$$

with an integer N.

According to the invention, the cooling ducts are now designed to be of such a length that they become resonant at the azimuthal fundamental frequency of the combustion chamber $\omega_0$. Their length is then $L_c = \lambda_0/2$, where $\lambda_0 = 2\pi c_c/\omega_0$ is the wavelength of the axial oscillation of the frequency $\omega_0$ in the cooling ducts. Here, the variable $c_c$ represents the velocity of sound in the unburnt cooling air.

The cooling ducts designed in such a way therefore dampen the azimuthal fundamental oscillation of the combustion chamber. Since the frequencies $\omega_0$, n of the higher azimuthal modes (0.n) of the combustion chamber, as explained above, are given by $n\omega_0$, the wavelengths of the corresponding axial oscillations in the cooling ducts are given by $\lambda_n = \lambda_0/n$. According to equation (3), the cooling ducts therefore dampen not only the azimuthal fundamental mode (0.1) but at the same time all the higher azimuthal modes (0.n).

The requisite length of the cooling ducts for a typical annular combustion chamber with $L \approx R$ is now to be estimated. The frequency of the azimuthal fundamental mode is given according to equation (2) by $\omega_{0,1} = c_H/R$, where $c_H$ represents the velocity of sound in the exhaust gas. According to the above, the requisite length of the cooling ducts is then $L_c = R\pi c_c/c_H$. For typical values of the velocity of sound in the unburnt gas, $c_c \approx 530$ m/s, and in the exhaust gas, $c_H \approx 780$ m/s, the requisite length results in $L_c \approx 2.1$ R $\approx 2$L. The cooling ducts must therefore be about twice as long as the combustion chamber.

Figure 2:
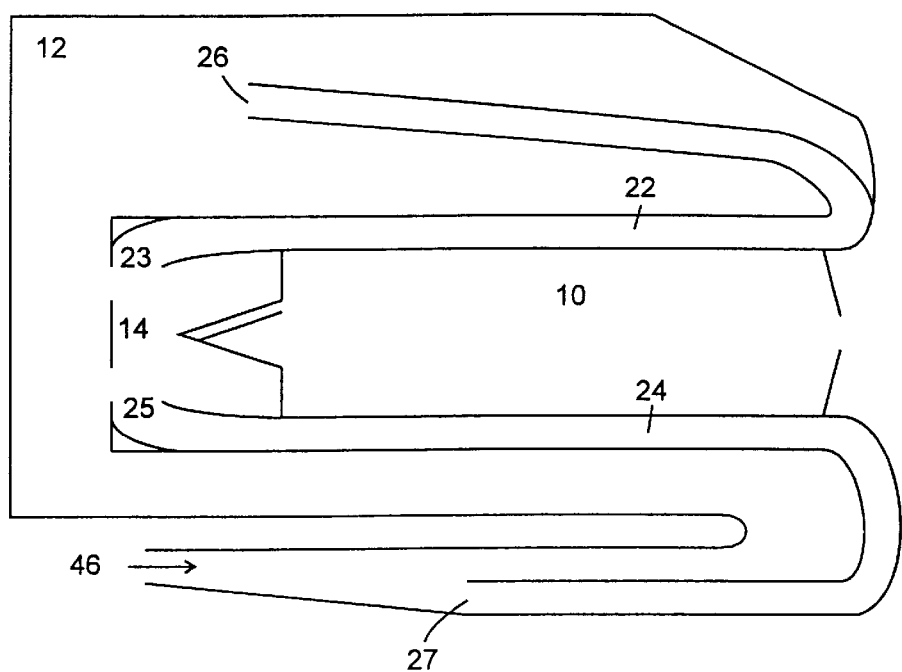
FIG. 2 shows a partial longitudinal section of an annular combustion chamber in schematic representation having a $\lambda/2$ cooling duct according to a first exemplary embodiment of the invention.

According to the invention, as shown in FIG. 2, the requisite length of the cooling ducts is achieved owing to the fact that the cooling ducts first of all run along the combustion chamber and bend back at the end of the combustion chamber into the collecting space.

Figure 3B:
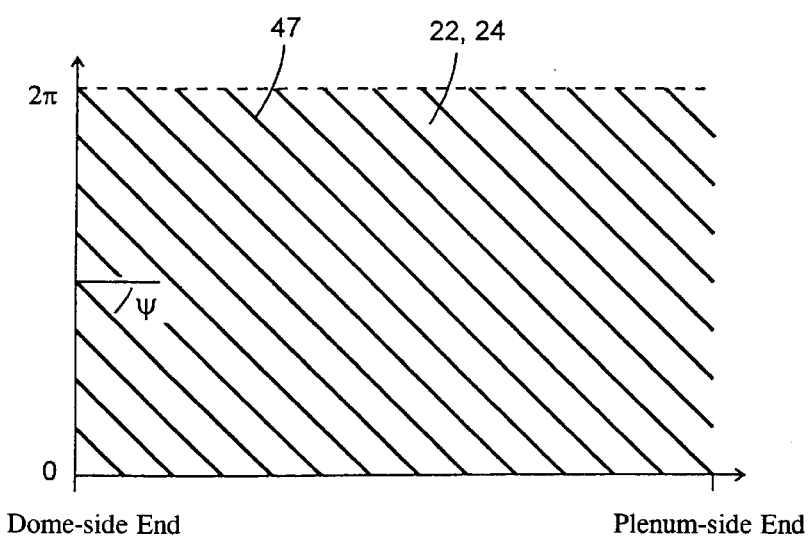
FIG. 3b shows a developed view of the cooling ducts wound spirally around the combustion chamber.

It is especially advantageous if the cooling ducts are run spirally around the combustion chamber, as shown in FIG. 3b. A plurality of the inner or outer cooling-duct segments 22, 24 are shown by way of example in FIG. 3b. The individual cooling-duct segments are separated from one another by partitions 47. The requisite length of the cooling ducts can be achieved in this embodiment by suitable selection of the angle $\psi$ between the combustion-chamber axis and the orientation of the ducts. As can be seen from FIG. 3b, the cooling ducts may be longer than the combustion chamber by a factor $1/\cos \psi$. In order to make the cooling ducts approximately twice as long as the combustion chamber, the angle should accordingly be $\psi \approx 60°$. An advantage of this embodiment of the invention is that the cooling ducts are run along the combustion-chamber wall over their entire length.

Given the accurate design of the cooling-air feed, it is still to be taken into account that the geometric length of the cooling ducts corresponds to the acoustic length of the cooling ducts only in the limit case of low frequencies. For higher frequencies, the usual final corrections are to be made in order to determine the precise, requisite geometric length of the cooling ducts.

Furthermore, the cross section of the openings 26, 27 of the cooling ducts toward the collecting space should as far as possible be markedly smaller than the cross section of the collecting space itself, in order to obtain well-defined reflection conditions at the end of the cooling ducts.

Finally, it is to be pointed out that Machnumber effects, that is, corrections due to gas velocities greater than about 10% of the velocity of sound, have been neglected in the above treatment for the sake of a clearer representation. Such corrections are necessary on account of the high gas velocities in the cooling ducts. However, the person skilled in the art will have no difficulty in making allowance for these corrections. The design of the cooling ducts with due allowance for these corrections—essentially an increase in the wave propagation times or natural frequencies by a factor of $1/(1-(u/c_c)^2)$ at a gas velocity u—is therefore within the scope of the invention described.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An annular combustion chamber for a gas turbine having natural frequencies comprising:

an air-cooled annular combustion chamber having at least one natural acoustic frequency, a combustion-chamber dome arranged upstream of said air-cooled combustion chamber, cooling ducts positioned to conduct at least a portion of an air flow coming from a compressor, the cooling ducts extending at least partially along the combustion chamber and having an entry into the combustion-chamber dome, wherein the cooling ducts are configured and arranged to minimize the acoustic impedance at the entry of the cooling ducts into the combustion-chamber dome at the at least one natural acoustic frequency of the annular combustion-chamber.

2. The annular combustion chamber as claimed in claim 1, wherein the combustion chamber has multiple natural acoustic frequencies, and wherein the cooling ducts are configured and arranged as resonators which become resonant at at least one of said multiple natural acoustic frequencies.

3. The annular combustion chamber as claimed in claim 2, wherein the length of the cooling ducts is half the wavelength of a fundamental frequency of said multiple natural acoustic frequencies.

4. The annular combustion chamber as claimed in claim 1, further comprising meridian partitions which divide the cooling ducts into ducts which are separate from one another.

5. The annular combustion chamber as claimed in claim 1, wherein the cooling ducts are U-shaped.

6. The annular combustion chamber as claimed in claim 1, wherein the cooling ducts extend spirally around the combustion chamber.

7. The annular combustion chamber as claimed in claim 1, further comprising a collecting space, wherein the cooling ducts further comprise second entry openings, the second entry openings being surrounded by the collecting space, the collecting space having a cross section at a location of the second entry openings, wherein the cross section of the second entry openings is small compared to the cross section of the collecting space to obtain well-defined acoustic reflection.

8. The annular combustion chamber as claimed in claim 1, wherein at least two individual cooling ducts have different lengths.

9. The annular combustion chamber as claimed in claim 1, wherein the at least one natural acoustic frequency of the combustion chamber is a fundamental acoustic frequency.

10. The annular combustion chamber as claimed in claim 1, wherein the length $L_c$ of the cooling ducts is approximately $R\pi c_c/c_H$.

* * * * *